(12) United States Patent
Doddaiah

(10) Patent No.: US 11,494,283 B2
(45) Date of Patent: Nov. 8, 2022

(54) ADJUSTING HOST QUALITY OF SERVICE METRICS BASED ON STORAGE SYSTEM PERFORMANCE

(71) Applicant: EMC IP HOLDING COMPANY LLC, Hopkinton, MA (US)

(72) Inventor: Ramesh Doddaiah, Westborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 171 days.

(21) Appl. No.: 16/865,458

(22) Filed: May 4, 2020

(65) Prior Publication Data

US 2021/0342245 A1 Nov. 4, 2021

(51) Int. Cl.
*G06F 11/34* (2006.01)
*G06F 9/48* (2006.01)

(52) U.S. Cl.
CPC ........ *G06F 11/3409* (2013.01); *G06F 9/4881* (2013.01)

(58) Field of Classification Search
CPC ............................ G06F 11/3409; G06F 9/4881
See application file for complete search history.

(56) References Cited

U.S. PATENT DOCUMENTS

| | | | | |
|---|---|---|---|---|
| 9,465,550 B1* | 10/2016 | Lippitt | ............... | G06F 3/0659 |
| 9,542,346 B2* | 1/2017 | Hrischuk | ............... | G06F 3/067 |
| 9,547,445 B2* | 1/2017 | Faulkner | ............... | G06F 3/0611 |
| 2005/0076154 A1* | 4/2005 | Chambliss | ............ | H04L 69/329 |
| | | | | 709/224 |
| 2015/0199148 A1* | 7/2015 | Hrischuk | ............ | G06F 11/3485 |
| | | | | 711/114 |
| 2015/0199388 A1* | 7/2015 | Hrischuk | ................ | G06F 16/21 |
| | | | | 707/802 |
| 2017/0302738 A1* | 10/2017 | Dimnaku | ............ | H04L 41/0893 |
| 2019/0179679 A1* | 6/2019 | Dimnaku | ................ | G06F 9/455 |
| 2021/0266358 A1* | 8/2021 | Cady | .................. | H04L 67/1097 |

* cited by examiner

*Primary Examiner* — Benjamin C Wu
(74) *Attorney, Agent, or Firm* — Anderson Gorecki LLP

(57) ABSTRACT

A storage system has a QOS recommendation engine that monitors storage system operational parameters and generates recommended changes to host QOS metrics (throughput, bandwidth, and response time requirements) based on differences between the host QOS metrics and storage system operational parameters. The recommended host QOS metrics may be automatically implemented to adjust the host QOS metrics. By reducing host QOS metrics during times where the storage system is experiencing high volumes of workload, it is possible to throttle workload at the host computer rather than requiring the storage system to expend processing resources associated with queueing the workload prior to processing. This can enable the overall throughput of the storage system to increase. When the workload on the storage system is reduced, updated recommended host QOS metrics are provided to enable the host QOS metrics to increase. Historical analysis is also used to generate recommended host QOS metrics.

8 Claims, 5 Drawing Sheets

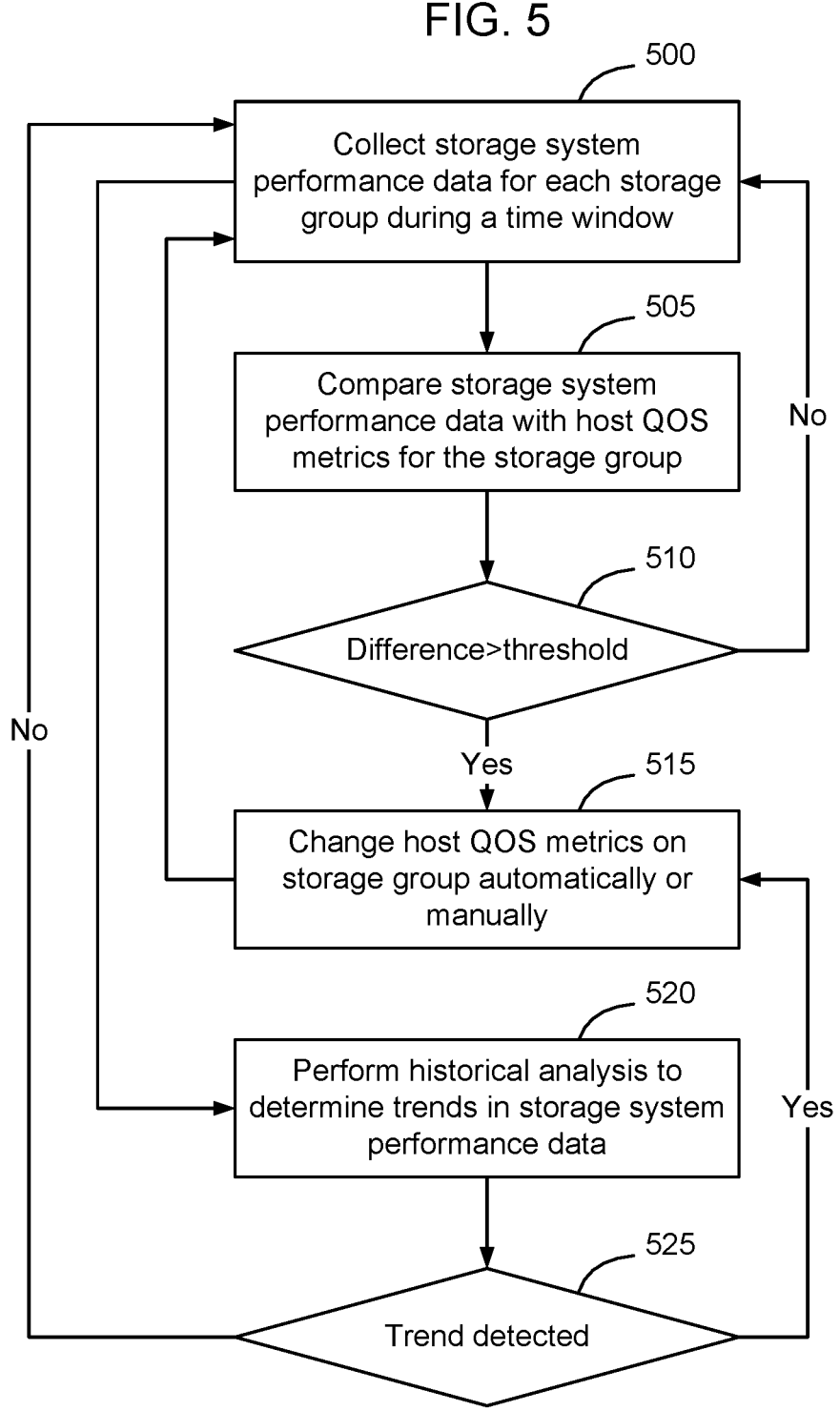

ADJUSTING HOST QUALITY OF SERVICE METRICS BASED ON STORAGE SYSTEM PERFORMANCE

FIELD

This disclosure relates to computing systems and related device and methods, and, more particularly, to a method and apparatus for adjusting host QOS metrics based on storage system performance.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a storage system has a QOS recommendation engine that monitors storage system operational parameters and generates recommended changes to host QOS metrics (throughput, bandwidth, and response time requirements) based on differences between the host QOS metrics and storage system operational parameters. The recommended host QOS metrics may be automatically implemented to adjust the host QOS metrics. By reducing host QOS metrics during times where the storage system is experiencing high volumes of workload, it is possible to throttle workload at the host computer rather than requiring the storage system to expend processing resources associated with queueing the workload prior to processing. This can enable the overall throughput of the storage system to increase. When the workload on the storage system is reduced, updated recommended host QOS metrics are provided to enable the host QOS metrics to increase. Historical analysis is also used to generate recommended host QOS metrics.

BRIEF DESCRIPTION OF THE DRAWINGS

FIG. 5 is a flow chart of an example method of adjusting host QOS metrics based on storage system performance, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer- readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
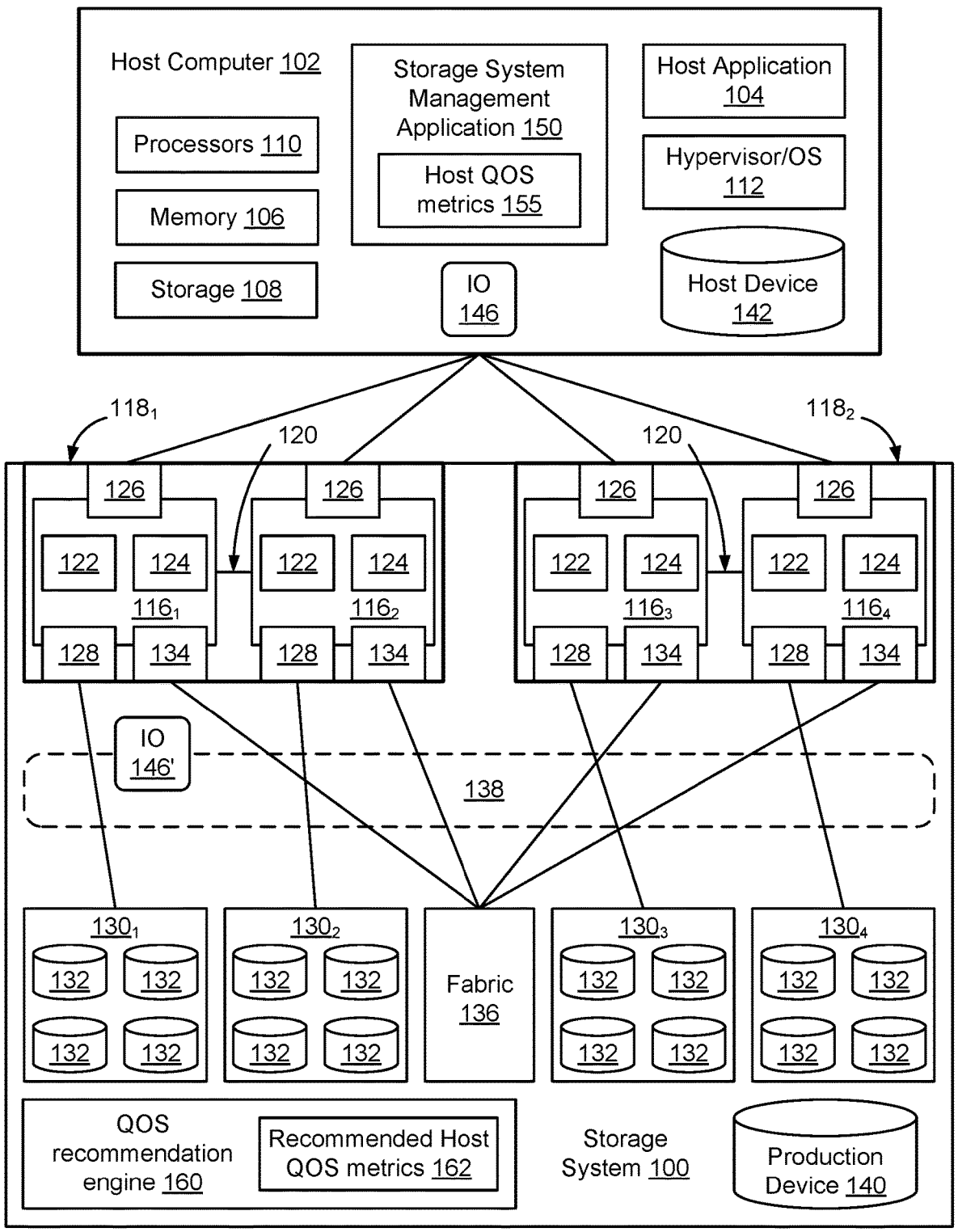
FIGS. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphical Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, and databases.

Logical storage devices are created and presented to the host application 104 for storage of the host application data. For example, as shown in FIG. 1, in some embodiments a production device 140 and a corresponding host device 142 are created implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, and databases.

Logical storage devices are created and presented to the host application 104 for storage of the host application data. For example, as shown in FIG. 1, in some embodiments a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output) command 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes 116$_1$-116$_4$ and paths, although the storage system 100 can be configured to limit use of certain paths to certain production devices 140.

In some embodiments, the storage system 100 presents storage volumes as TLUs (Thin Logical Units). A TLU is a logical construct which enables the physical drives 132 of the storage system 100 to be abstracted from the host applications 104. A logical unit is "thin", as that term is used herein, when actual physical capacity of drives 132 is only allocated to the TLU as needed. For example, a TLU may be presented to the host application 104 as having an available size of 1T(terabyte). However, if the filesystem stored in the TLU is only 0.5 T in size, the storage system 100 will only allocate 0.5 T of physical storage resources on drives 132 to the TLU. Thus, the amount of physical storage resources allocated to a TLU will increase and decrease over time as the amount of data stored on the TLU changes over time. Within the physical storage resources, Data Devices (TDATs) are used to store the data, in which a given TDAT may be formed of a redundant group of physical disk drives, i.e. a TDAT may be formed from a RAID group of disk drives 132 that store blocks of data within the storage array 130.

Different storage resources may have different IO characteristics. Storage resource 132 with similar IO characteristics are grouped together to form storage pools. Storage groups 170 (see FIG. 2) are created within the storage pools. TLUs are allocated physical storage resources from a selected storage pool based on intended service level objectives for the data contained in the filesystem maintained by the TLU. The service level objectives are set by host computer 102 as host QOS metrics 155. Different production devices 140 may have different service level objectives and, accordingly, different production devices 140 may be located in different storage groups 170.

As shown in FIG. 1, in some embodiments one of the applications executing on the host computer 102 is a storage system management application 150. The storage system management application 150 enables a customer to set host QOS (Quality Of Service) metrics 155 on the storage system 100. Depending on the implementation, the host QOS metrics 155 may include multiple parameters of storage system 100 operation. Example host QOS metrics 155 may include, for example throughput, bandwidth, and response time. Throughput specifies the number of IOPS (IO operations per second) that the storage system 100 should provide. Bandwidth (MB/second) specifies the amount of front-end or back-end resources that should be allocated, such as on the front-end adapter 126, back-end adapter 128 and/or fabric 136. Response time specifies (ms) specifies the maximum amount of time the storage system 100 should take to respond to an IO operation. Numerous host QOS metrics 155 may thus be specified, and different host QOS metrics 155 may be set for different storage groups 170 or host devices 142.

Figure 2:
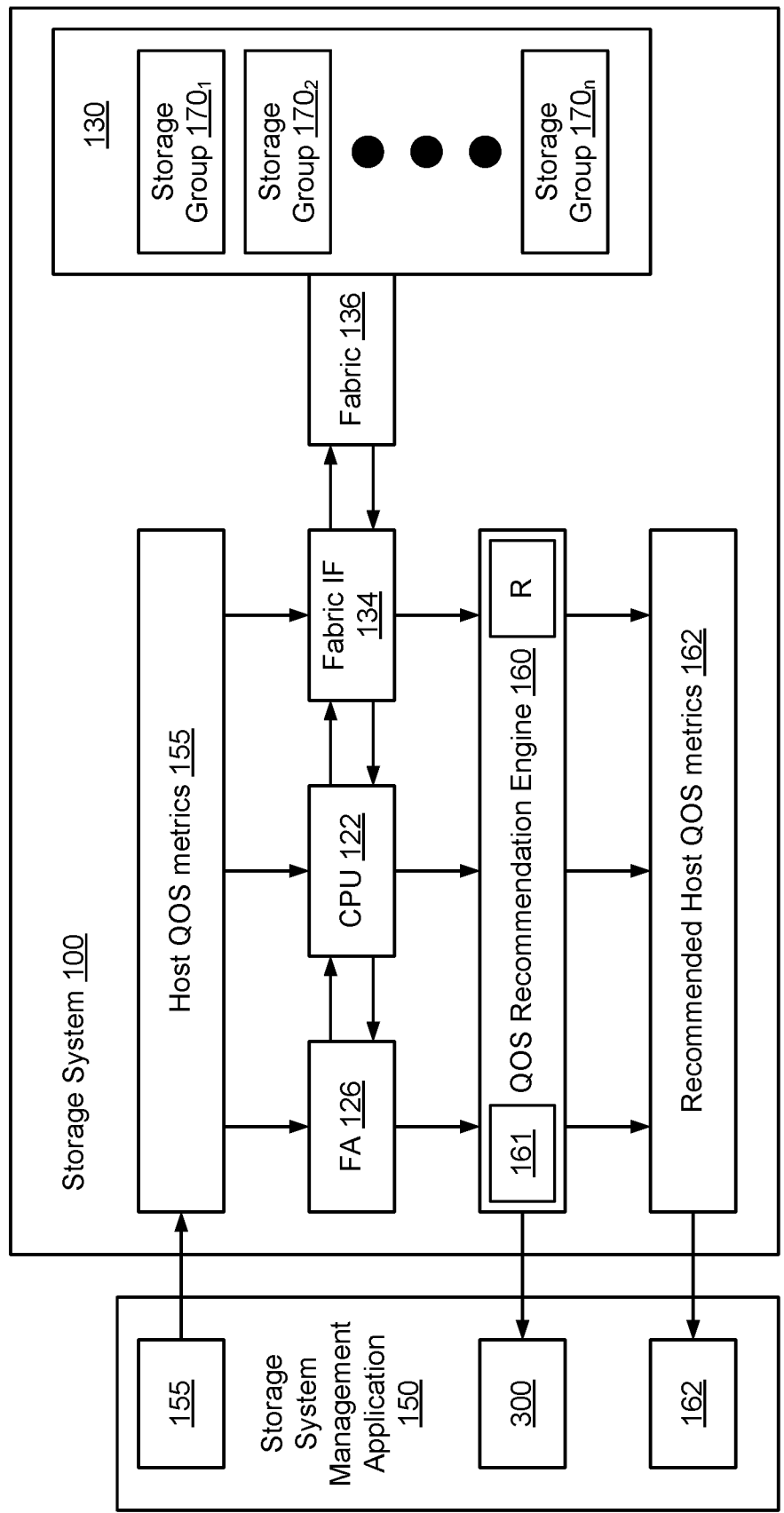
FIG. 2 is a functional block diagram showing aspects of the QOS management aspects of the host computer and storage system of FIG. 1 in greater detail, according to some embodiments.

FIG. 2 is a functional block diagram showing aspects of the QOS management aspects of the host computer and storage system of FIG. 1 in greater detail, according to some embodiments. As shown in FIG. 2, in some embodiments the storage system 100 has a QOS recommendation engine 160 configured to monitor operation of the components of the storage system and generate recommended host QOS metrics 162. For example, the QOS recommendation engine 160 may monitor operation of the front end adapter 126, CPU 122, fabric interface 134, and other operational aspects of the storage system 100, to learn how much of each storage system 100 resource is being used by each storage group 170.

Rather than setting host QOS metrics 155 as discrete static values per storage group 170, the recommended host QOS metrics 162 are provided to the storage system management application 150 on host computer 102, to enable the host computer 102 to adjust the host QOS metrics 155. This enables host QOS metrics to be set based on a learned time series composite function within the storage system 100, with lower and upper bound values set per storage group 170.

In some embodiments, storage system 100 run time is divided into windows, and for each time window a QOS (Quality Of Service) recommendation engine 160 analyzes the internal performance metrics for each storage group 170. The actual performance data of how the storage system 100 is performing is compared with the set of host QOS metrics 155 that has been set by the host computer 102 on those same storage groups 170, to determine if there are any mismatches between the host QOS metrics 155 that have been set by the customer, and the actual operation of the storage system 100. Where there is a difference between the host QOS metrics 155 and the performance that the storage system 100 is actually able to provide, the QOS recommendation engine 160 generates recommended host QOS metrics 162 that describe changes that should be made to change host QOS metrics 155 on the storage groups 170 for respective time windows. Aligning host QOS metrics 155 with storage system 100 performance increases overall performance of the storage system 100. Specifically, by reducing the host QOS metrics 155 during periods where the storage system 100 is experiencing a high workload, the host computer 102 will reduce the number of IOs provided to the storage system 100. This allows the storage system 100 to use more of its resources to process IOs rather than using its resources to store IOs prior to processing, which improves overall storage system 100 performance by aligning storage system 100 resources with high priority storage groups 170.

Setting correct host QOS metrics 155 on storage groups 170 is necessary to enable a storage system 100 to serve different mixed workloads across multiple tenants (multiple host computers). Some types of workloads on the storage system 100 are moderately predictable, such as storage system 100 workloads associated with data replication and backup operations. Other types of workloads, such as storage system 100 workloads associated with on-line transaction processing, depends on business operations which makes these types of workloads difficult to predict. Typically, customers set discrete host QOS metrics 155 for on-line transaction processing storage groups 170, replication storage groups 170, and backup storage groups 170. Since on-line transaction processing workload is often unpredictable, setting accurate host QOS metrics 155 for the on-line transaction processing storage group 170 can be difficult. If the host QOS metrics 155 for this storage group 170 are set to aggressively, this will result in over-allocation of storage system 100 resources to this storage group 170.

In some storage systems 100, enforcing host QOS metrics 155 is quite costly. Fiber channel or NVME Driver Interface threads in the front-end adapter 126 often work at the port level and don't adhere to host QOS metrics 155. This means that the driver thread will continue to pull new command requests (IOs) from Fibre Channel (front end) ports and allocate local memory to the command requests. Additionally, in some embodiments, each command request involves a jorecord, Input/Output Control Block (IOCB) driver resources, Fibre Channel (FC) exchange control block resources, and miscellaneous store and forward buffers etc.

Additionally, each new command is added to the driver internal scheduling queue, and eventually to the host adapter 126 QOS priority queue management. This means that the host adapter 126 and other layers will spend many CPU cycles to repeatedly poll to check if IO's are getting throttled according to the host QOS metrics 155. These memory and CPU resources, therefore, cannot be used for other important high priority storage groups 170 as well. This means that a storage groups 170 with lower host QOS metrics 155 can end up taking more memory and CPU cycles in preference to other higher priority storage groups 170, which is counter intuitive. Accordingly, it would be advantageous to provide a way to address this internal storage system 100 resource wastage problem that occurs when the host QOS metrics 155 are set too high on one or more storage groups 170, given the ability of the storage system 100 to process its current workload. In some embodiments, it would be advantageous to provide a method to throttle IOs from the host computer 102 with exceptionally reduced cost.

Host QOS metrics 155 are often set statically by ad hoc and heuristic processes, or based on past-experience by storage administrators. Static and discrete host QOS metrics 155 are too restrictive and are implemented using a manual process, which generally doesn't change with time based on the dynamic workload on the storage system 100. Further, the storage system 100 does not provide feedback to the host computer 102, causing storage system 100 resources to be underutilized or overutilized across different workloads and across different times on different storage groups 170. The host QOS metric 155 mismatches across different storage groups 170 can cause resources of the storage system 100 to be incorrectly allocated, which reduces overall throughput of the storage system 100. For example, in time window T1, storage group 1701 might need more bandwidth compared to storage group 1702. However, with statically defined host QOS metrics 155, the storage system 100 may be unable to allocated additional resources to storage group 1701 thus reducing the overall performance of the storage system 100. Accordingly, it would be advantageous to enable the storage system 100 to participate in adjusting host QOS metrics 155 and make recommendations as to how the host QOS metrics 155 should be changed. In some embodiments, based on an internal workload analysis on the storage groups 170, in a time window T, the storage system 100 determines which storage groups 170 should be allocated additional storage system 100 resources, and makes recommendations as to how the host QOS metrics 155 should be adjusted.

In some embodiments, for each storage group 170, there are two types of QOS metrics: host QOS metrics 155 which are set by the host computer 102, and recommended host QOS metrics 162 that are determined by the storage system 100.

As shown in FIG. 1, in some embodiments the host QOS metrics 155 are set using the storage system management application 150. The host QOS metrics 155 specify the high-level parameters that must be met by the storage system 100 for IO operations on particular storage groups 170.

The recommended host QOS metrics 162 are learned by the storage system 100 based on workload analysis of storage system 100 across different time windows. In some embodiments, the recommended host QOS metrics 162 are determined by a QOS recommendation engine 160, and are based on a QOS recommendation function. The recommendation function, referred to herein using the letter "R", in some embodiments is a composite function including a combination of N functions, such as $F_1, F_2, F_3, F_4 \ldots F_N$. Equation 1, set forth below, shows an example recommendation function R:

$$R(IPOs, RT \text{ and Bandwidth Recommendation for a given Storage Group}(SG1\_Time\_window\_1) \text{ in a given Time Window}) = \frac{1}{T} \sum_{T=0}^{T \text{ minutes}}$$

(Storage System Response Time time series upper bound values − Host $QOS$ set discrete Response Time) ∗ weight1
(Storage System $IPOS$ time series upper bound values − Host $QOS$ set discrete $IOPS$ value) ∗ weight2
(Storage System Bandwidth time series upper bound values − Host $QOS$ set discrete Bandwidth value) ∗ weight3

Equation 1

In equation 1, R is a composite function having three terms, $R=F_1+F_2+F_3$. Function $F_1$ is the difference between the host QOS metric 155 that the customer specified for the storage system 100 response time for the given storage group 170, and the response time the storage system 100 is actually seeing, internally, for the same storage group 170 during a given time window T. Function $F_2$ is the difference between the host QOS metric 155 that the customer specified for the number of input/output operations per second (IOPs) for the given storage group 170, and the number of IOPs the storage system 100 is actually seeing, internally, for the same storage group 170 during the given time window T. Function $F_3$ is the difference between the host QOS metric 155 that the customer specified for the bandwidth for the given storage group 170, and the bandwidth the storage system 100 is actually seeing, internally, for the same storage group 170 during the given time window T. Thus, the recommendation function R, in some embodiments, enables any mismatch between host QOS metrics 155 and actual storage system 100 performance to be quantified by the QOS recommendation engine 160.

Each component of the recommendation Function R ($F_1$, $F_2$ and $F_3$), are weighted separately as needed by the customer to provide different priorities for response time, the number of IOs per second, or bandwidth. For example, by setting the weight factor for response time to 1 (Weight 1=1), and setting the weighting factors for IOPs and bandwidth to 0.1 (Weight2=0.1; Weight 3=0.1), the recommendation function R would provide greater emphasis on the storage system 100 response time when making recommendations for adjustment to host QOS metrics 155. In some embodiments, by default, each weight is set to 1 i.e. all weights are same.

The output of the recommendation function R is a set of recommended host QOS metrics 162 which, in some embodiments, are used to automatically adjust the host QOS metrics 155 for the upcoming time window. For example, as shown in FIG. 2, in some embodiments the recommended host QOS metrics 162 are passed to storage system management application 150 and used by storage system management application 150 to change host QOS metrics 155 for an upcoming time interval. In other embodiments, the output of the recommendation function R is used to make a recommendation to the storage system management application 150 to prompt the customer to make changes to the host QOS metrics 155. Additionally, the values of the components of the recommendation function R indicate how the host QOS metrics 155 should be changed. Specifically, the value of the F1 component indicates the amount that the host QOS metric 155 associated with response time should be changed, the value of the $F_2$ component indicates the amount that the host QOS metric 155 associated with IOPs should be changed, and the $F_3$ component indicates the amount that the host QOS metric 155 associated with bandwidth should be changed. In some embodiments, the values of the components of the recommendation function ($F_1$, $F_2$, $F_3$) are provided to storage system management application 150.

In some embodiments, additional storage system 100 workload features are similarly used to create additional weighted components R=($F_4$, $F_5$, . . . $F_N$) that are also included in the recommendation function R($F_1$, $F_2$, $F_3$, $F_4$, $F_5$, . . . $F_N$) that is used by QOS recommendation engine 160 to generate the recommended host QOS metrics 162.

One example of an additional component ($F_4$) that may be included in the recommendation function R is whether prefetch has been turned on/off on cache 124 for a given storage group 170 in this given time window. If customer chooses prefetch to be switched off for given storage group 170, this decision will reduce storage system 100 fabric bandwidth consumption that can then be used by other storage groups 170, but may also lead to read misses for sequential host IOs 146. Each storage system 100 feature, such as whether prefetch is turned on for the cache, the amount of storage system 100 resources that are consumed in connection with features such as synch/async replication of data to other storage systems 100, log scrubbers, and low priority tasks, is computed with respect to CPU cycle consumption, memory consumption and fabric bandwidth consumption per storage group 170, and can be controlled by the customer as each storage system 100 feature has its own weights per storage group 170.

Thus, in some embodiments, the recommendation function R (IOPs, response time, and Bandwidth Recommendation for a given Storage Group(SG1_Time_window_1) during a given Time Window)=

F1 (storage system response time, customer set response time)*Weight1+

F2(storage system IOPS, customer set IOPs) *Weight2+

F3(storage system bandwidth, customer set bandwidth) *Weight3+

F4(storage group (SG) level Prefetch CPU consumption time series)*Weight4+

F5(SG level Prefetch fabric bandwidth consumption time series)*Weight5+

F6(SG level Asynchronous Memory consumption time series)*Weight6+

F7(SG level Asynchronous CPU cycle consumption time series)*Weight7+

F8(SG level data relocation feature CPU cycle consumption time series)*Weight8 . . .

The customer can choose to switch off any storage system 100 feature per storage group 170 by setting the weights of the respective feature to zero. In some embodiments, by default each feature has equal priority, and weights 1-8 are all set to 1. Other default values may be used, depending on the implementation.

In some embodiments, time is divided into N windows per hour. By default, each time window is IO minutes, but the duration of the time windows can be user defined. During each time window, a time series is generated for the number of IOs per second, storage system 100 response time, and storage system 100 internal bandwidth consumption, for each storage group 170 (or device 140). The time series is used to find lower and upper bound values by using exponential moving averages. These values are then compared with customer set host QOS metrics 155 to find if the storage system 100 is over utilized or underutilized. For each storage group 170, recommended host QOS metrics 162 such as prefetch, asynchronous replication, data relocation, scan, low priority tasks and scrubbers are computed. Recommended host QOS metrics 162, in some embodiments, are defined by percentage of CPU cycles, percentage memory usage, and percentage of bandwidth consumption, and are calculated per storage group 170.

The recommended host QOS 162 metrics are used to populate a data structure 300 (see FIG. 3) containing information about the amount (percentage) of the storage system 100 resources each feature is consuming. In some embodiments, the data structure 300 is provided to storage system management application 150 to enable the storage administrator to be able to access this information. The storage system 100 resource cost per feature is aggregated across all host computers 102 for each storage group 170. Similarly, a time series is also built for each storage system 100 internal resource consumption with its own lower and upper bound in a given time window.

Figure 3:
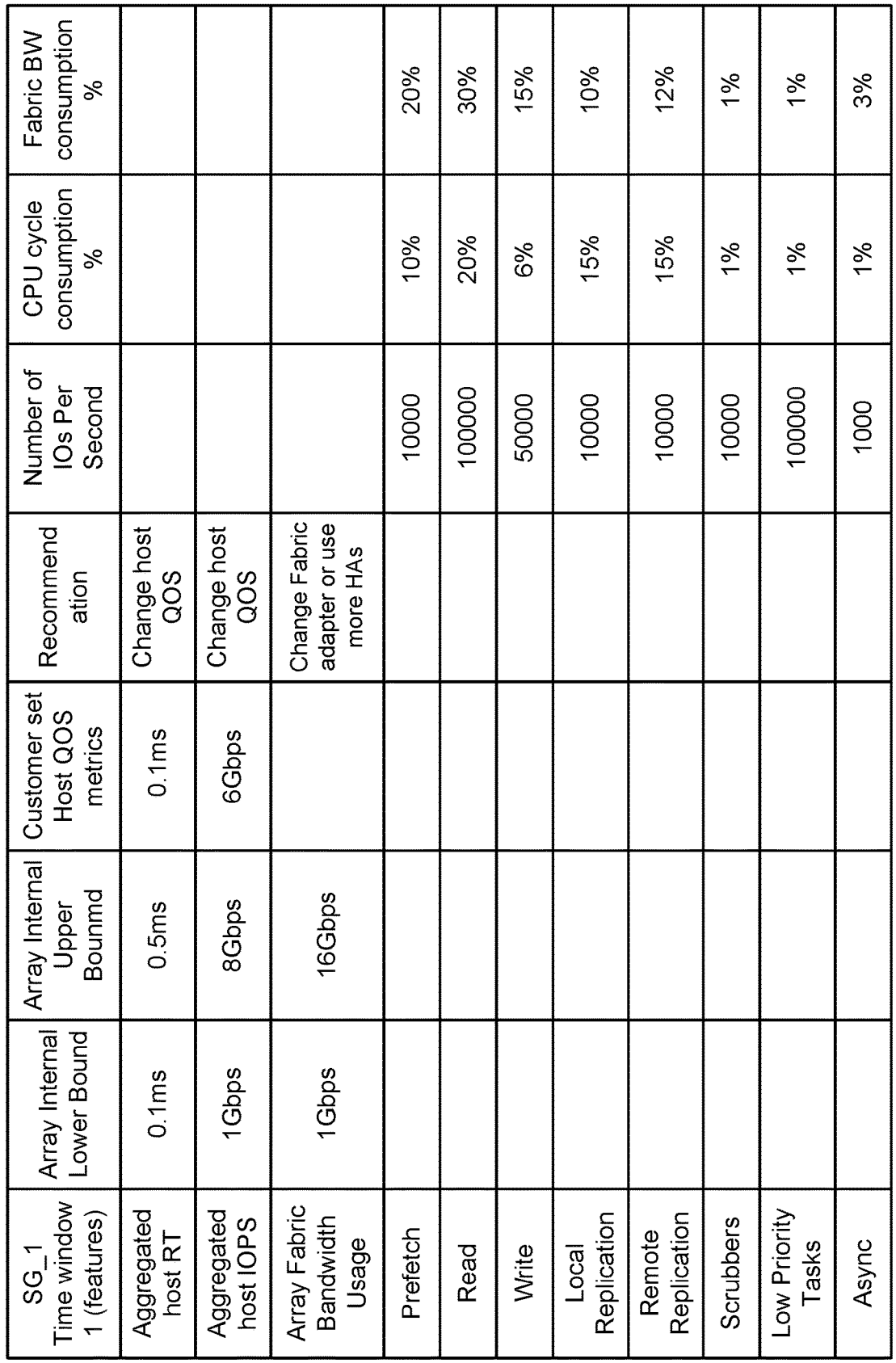
FIG. 3 is a functional block diagram of an example data structure containing storage system performance data for use by a QOS (Quality Of Service) recommendation engine to recommend changes to host QOS metrics or automatically implement changes to host QOS metrics based on storage system performance, according to some embodiments.

FIG. 3 is a functional block diagram of an example data structure 300 containing example storage system 100 performance data for use by a QOS recommendation engine 160 to implement or recommend QOS adjustments to host QOS metrics 155 based on storage system 100 performance, according to some embodiments. As shown in FIG. 3, during a time window, the QOS recommendation engine 160 collects data on numerous features. For example, one of the system performance parameters that may be monitored by the QOS recommendation engine 160 is the "Aggregate Host RT" (Response Time). In the example data structure 300 shown in FIG. 3, an example storage system 100 internal lower bound response time of 0.1 ms was recorded during the time interval, and an example storage system 100 upper bound response time of 0.5 ms was recorded during the time interval. The customer set host QOS metric 155, by contrast, was set to 0.1 ms. This indicates that the host QOS metric 155 is set to a value (0.1 ms) which is not consistently being met by the storage system 100.

Additionally, as shown in FIG. 3, the QOS recommendation engine 160 also collects "Aggregated Host IOPS" (Input/Output Per Second) during the time interval. In the example data structure 300 shown in FIG. 3, the storage system 100 internal lower bound value was 1 Gbps (gigabyte per second) and the storage system 100 internal upper bound value was 8 Gbps. The host QOS metric 155 for aggregated IOPs was set to 6 Gbps. This indicates that the storage system 100 is overused, or that the host QOS metrics 155 for this parameter is not set high enough.

The combination of measured vs requested response time and measured vs requested bandwidth indicates that the storage system 100 is either over-utilized or that the host QOS metrics 155 for the storage group 170 are not set properly. To enable the storage system 100 to more consistently meet the host QOS metrics 155, a recommendation is provided by the QOS recommendation engine 160 that the host QOS metric 155 for bandwidth be increased from 6 Gbps to 8 Gbps. This will enable the host computer 102 workload on the storage group 170 to be given higher priority from a bandwidth perspective, to enable the storage system 100 to more closely achieve the 0.1 ms response time specified in the host QOS metrics 155.

Looking at the line entry for "Array Fabric Bandwidth Usage", it can be seen that the maximum storage system 100 bandwidth used during the time interval was 16 Gbps. However, in this example the host computer 102 is connecting to a front-end adapter 126 on the storage system 100 that has an 8 Gbps speed, which is reducing the storage system 100 response time. The recommendation by the QOS recommendation engine 160 is that the host computer 102 should use a 16 Gbps front-end adapter 126 or use multiple front-end adapters 126 when communicating with the storage system 100. Specifically, while changing the host QOS bandwidth metric 155 from 6 Gbps to 8 Gbps will help slightly, the fact that the maximum fabric bandwidth was 16 Gbps for this storage group indicates that the host computer 102 should either use a front-end adapter 126 with a larger bandwidth to address this performance issue or to distribute the host workload on storage group 1701 across more front-end adapters 126. Also, it can be seen from the "Prefetch" entry that prefetch has been turned on, and from the "read" entry, it appears that 30% of the fabric bandwidth is being consumed by read operations, which indicates that large sequential reads are in progress.

In some embodiments the QOS recommendation engine 160 recommends changes to host QOS metrics 155 per storage group 170, per time interval, to cause the host computer 102 to adjust its QOS metrics 155 to better match the capabilities of the storage system 100.

In some embodiments, the QOS recommendation engine 160 does a live technical analysis on time series charts for host IOPS, host response time, host FC bandwidth, storage system 100 internal fabric bandwidth, storage system 100 memory consumption, prefetch CPU cycle consumption, prefetch fabric bandwidth consumption, asynchronous replication CPU cycle consumption, asynchronous replication fabric bandwidth consumption, and storage system 100 CPU cycle consumption, per storage group 170, to find the current storage burst (trend) activities on a given storage group 170. In some embodiments, this analysis is implemented using exponential moving averages for every time window. The time windows may be, for example, ten minutes in length or some other amount of time depending on the implementation. Lower and upper bound values from these time series values are compared with customer set host QOS metrics 155 to find average percentage of over utilization or under-utilization of storage system 100 resources. The QOS recommendation engine 160 then provides a set of recommended changes to the host QOS metrics 155. The recommended changes to host QOS metrics 155 may be output as normalized values or as in percentages. In some embodiments, the time series values per storage group 170 are saved for subsequent historical analysis.

In some embodiments, QOS recommendation engine 160 also does historical technical analysis to find any trend or seasonality in time series charts for host IOPS, host RT, host FC Bandwidth, internal fabric bandwidth, memory consumption, and CPU cycle consumption per storage group 170 across different time (windows) and days using double and triple exponential moving averages or uses a learning process 161 (see FIG. 2. In some embodiments, the learning process 161 is a learning process such as a such as a long short-term memory model (LSTM neural network).

Simple moving average analysis is also done on live and historical time series for host IOPS, RT and bandwidth, which can be used to determine lower bound values for the recommended host QOS metrics 162.

In some embodiments, the upper bound for recommended host QOS metrics 162 per storage group 170 comes from Max (weight_1*LSTM prediction, weight_2*exponential moving averages prediction, weight_3*host specified QOS metrics 155). Max upper bound values are weighted based on customer expectations. The customer can elect to use this dynamic recommendation feature or use only customer defined host QOS metrics 155 or a combination of both host QOS metrics 155 and the recommended host QOS metrics 162 across different times. In some embodiments, values for weight_1, weight_2 and weight_3 determines the customer preferences.

The recommendation engine 160 provides, as output, recommended host QOS metrics 162 in the form of recommendations on both lower(*Weight_A) bound host QOS metrics 155 and higher(*Weight_B) bound host QOS metric 155 for each storage groups 170 to host computer 102. Lower and higher bounds are also weighted here, so the customer can define preferences as needed. If a customer goes with weight_B always, then it might under-utilize the storage system 100 resources i.e. some storage groups 170 will get more storage system 100 resources, even when they are not needed thus causing performance issues for other storage groups 170. If a customer gives equal preference for both lower and upper bound weights, then the storage system 100 does better scheduling by moving storage system 100 resources between storage groups 170, e.g. from to storage group 1701 to storage group 1702 (or other storage groups 170) as needed, while still maintaining storage group 1701 host QOS metrics 155 to meet its lower bound values. If the workload on storage group 1701 increases, then the storage system 100 dynamically moves storage system 100 resources from other low priority storage groups 170 and moves those resources to storage group 1701. Storage groups 170 are prioritized based on response time, IOPs and bandwidth requirement as set by the host QOS metrics 155.

The QOS recommendation engine 160 provides recommended host QOS metrics 162 per storage group 170 per time window. Having these recommended host QOS metrics 162 enable the host computer 102 to throttle some host applications 104 (like oracle, SAP, DB, OLTP, OLTA) when necessary, to cause the storage system 100 to devote more of the storage system 100 resources to higher priority applications (or storage groups 170), thus both the host computer 102 and the storage system 100 cooperatively cause storage system 100 resources to be allocated to the correct storage groups 170, to service workloads for the correct host applications 104, at the right time.

In some embodiments, each time series (trajectory) is split into multiple time windows (from few minutes to few hours per window). By analyzing how much storage system 100 resources (example CPU cycles, memory, bandwidth) each storage system 100 feature (example multi tenancy, compression, data relocation) takes in a given time window per storage group 170, it is possible to understand what percentage of these resources are relevant and irrelevant with respect to host QOS metrics 155. When additional storage system 100 resources are available for use by the host computer 102, the QOS recommendation engine 160 quantifies the amount of available system resources and provides the host computer 102 with updated recommended host QOS metrics 162, to enable the host computer 102 to increase the workload on the storage system 100. If multi tenancy feature takes more CPU cycle in a given window for a given storage group 170, it means that the storage system 100 is spending a large amount of CPU cycles just to throttle the IO's in the front end (host adapter 126) layer unnecessarily, instead of using these resources to service 10s. Excessive unnecessary throttling means host QOS metrics 155 were probably not set right in the first place by customers on those storage groups 170, or that the storage administrators underestimated the host QOS metrics 155 for given storage group 170.

Figure 4:
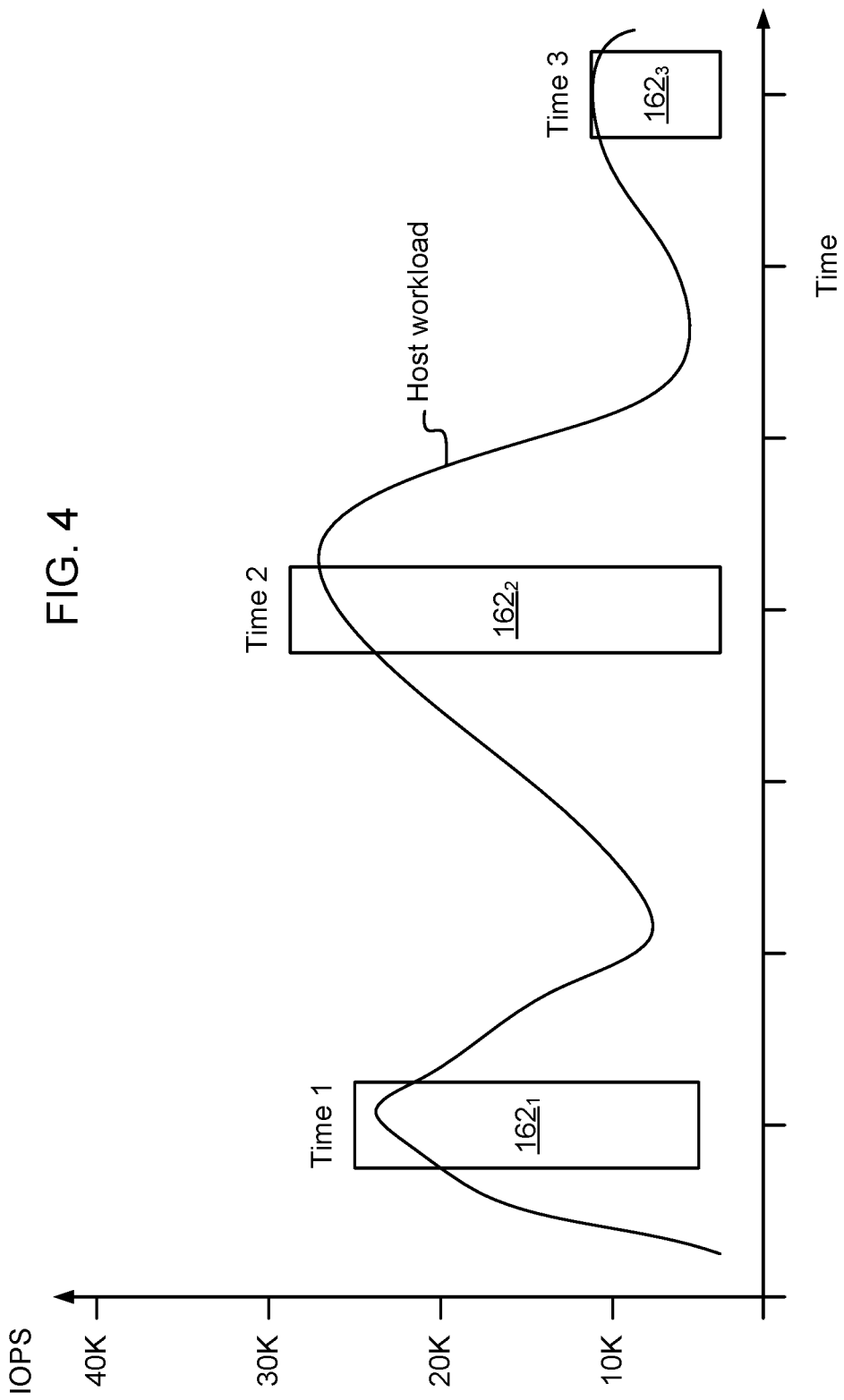
FIG. 4 is a graph showing fluctuation of host QOS metrics over time based on the output of a QOS recommendation engine, according to some embodiments.

FIG. 4 is a graph showing fluctuation of host QOS metrics over time based on the output of a QOS recommendation engine, according to some embodiments. Rather than simply utilizing fixed host QOS metrics 155 and holding the host QOS metrics 155 at a constant value, in some embodiments the QOS recommendation engine 160 automatically adjusts the host QOS metrics 155 according to demand on the storage system 100, so that the host QOS metrics 155 are not set too high relative to a level of service that the storage system 100 is able to provide. Accordingly, the host QOS metrics 155 are aligned with a level of service that the storage system 100 is able to provide, given other demands on storage system 100 resources. By adjusting the host QOS metrics 155, it is possible to cause the number of IO 146 per second from the host computer 102 to the storage system 100 to more closely align with the amount of work that the storage system 100 is able to perform. By reducing the amount of excess work provided by the host computer 102 to the storage system 100, it is possible to reduce the amount of CPU cycles used by the storage system 100 to manage that excess workload from the host computer 102, to thereby free those resources for use in connection with processing IO operations.

In the example shown in FIG. 4, in a first time-interval the QOS recommendation engine 160 recommends that the host QOS metric 155 for IOPS be set to 20K. At a second time interval, the QOS recommendation engine 160 recommends that the host QOS metric 155 for IPS be set to 30K. At a third time interval, the QOS recommendation engine 160 recommends that the host QOS metric 155 for IOPS be set to 10K. By dynamically changing the host QOS metric 155 in this manner, the host QOS metrics 155 are able to be set to match the capabilities of the storage system 100 to reduce overhead associated with setting the host QOS metric 155 in excess of the capabilities of the storage system 100 for the storage group 170. The time interval shown in the graph of FIG. 4 can be dynamically determined based on current conditions at the storage system 100 or, may be based on historical traffic patterns.

FIG. 5 is a flow chart of an example method of adjusting host QOS metrics based on storage system performance, according to some embodiments. In some embodiments, the method includes collecting storage system 100 performance data for storage groups 170 during a time window (block 500). The collected storage system 100 performance data is then compared with host QOS metrics 155 for the storage group 170 (block 505). In some embodiments, comparing the storage system 100 performance data with host QOS metrics 155 is implemented by a QOS recommendation engine 160 using the recommendation equation R described in greater detail above.

A comparison is then made to determine whether the recommended host QOS metrics 162 output by the QOS recommendation engine 160 are different than the host QOS metrics 155. Optionally, as shown in FIG. 5, a threshold may be used to determine if the recommended host QOS metrics 162 are sufficiently different than the host QOS metrics 155. The threshold may be set to zero if it is desired to always output the recommended host QOS metrics 162.

If the recommended host QOS metrics 162 are sufficiently different from the host QOS metrics 155 (a determination of YES at block 510), the host QOS metrics 155 on the storage group 170 are automatically or manually adjusted (block 515). If the recommended host QOS metrics 162 are not sufficiently different from the host QOS metrics 155 (a determination of NO at block 510) the process returns to continue collecting storage system 100 performance data for the storage group 170 during a subsequent time period. This process iterates for each time period, and for each storage group 170.

As shown in FIG. 5, in some embodiments the storage system performance data that is collected for each storage group 170 in block 500 is also used by the QOS recommendation engine 160 to perform historical analysis (e.g. using learning process 161) to determine trends in storage system 100 performance (block 520). If a trend is detected (a determination of YES at block 525), the historical analysis can be used to automatically or manually adjust the host QOS metrics 155 (block 515) to account for the anticipated changes in storage system 100 performance. If no trend is detected, the process returns to continue collecting storage system 100 performance data for the storage group 170 during a subsequent time period. This process iterates for each time period, and for each storage group 170.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for adjusting host QOS metrics based on storage system performance, the computer program including a set of instructions which, when executed by a computer, cause the computer to perform a method comprising the steps of:
   setting host QOS metrics by a host, the host QOS metrics specifying throughput, bandwidth, and response parameters to be achieved by a storage system in connection with servicing a workload from the host on the storage system, the storage system comprising a plurality of storage groups;
   receiving the workload by the storage system from the host, the workload being associated with the host QOS metrics;
   collecting storage system performance data for each storage group during a time window;
   comparing storage system performance data with the host QOS metrics for each storage group during the time window to determine if the storage system performance is compliant with the host QOS metrics;
   generating recommended host QOS metrics for each storage group based on the storage system performance data and the host QOS metrics during the time window;
   using the recommended host QOS metrics to automatically set the host QOS metrics during the next upcoming time window; and
   iterating, for each time window, the steps of:
      receiving the workload;
      collecting storage system performance data;
      comparing storage system performance data with the host QOS metrics;
      generating recommended host QOS metrics; and
      using the recommended host QOS metrics to automatically set the host QOS metrics during the next upcoming time window;
   wherein when the difference between storage system performance and host QOS metrics exceeds a threshold, the step of generating recommend host QOS metrics and using the recommended host QOS metrics to automatically set the host QOS metrics comprises reducing the host QOS metrics to throttle the workload from the host on the storage system;
   wherein the step of generating recommended host QOS metrics is implemented, for each storage group, for each time window, using a composite recommendation function;
   wherein the host QOS metrics comprise throughput, bandwidth, and response time requirements per storage group;
   wherein the composite recommendation function has a first function that determines, for each storage group for each time window, a respective difference between the storage system throughput for that storage group and the host QOS metric for throughput for that storage group;
   wherein the composite recommendation function has a second function that determines, for each storage group for each time window, a respective difference between the storage system bandwidth for that storage group and the host QOS metric for bandwidth for that storage group;
   wherein the composite recommendation function has a third function that determines, for each storage group for each time window, a respective difference between the storage system response time for that storage group and the host QOS metric for response time for that storage group; and
   wherein the composite recommendation function separately weights each of the first, second, and third functions, to enable greater emphasis to be placed on one of the functions of the composite function when determining recommended host QOS metrics.

2. The non-transitory tangible computer readable storage medium of claim 1, further comprising using the storage system performance data to learn historical storage system usage patterns, and using the historical storage system usage patterns in the step of generating recommended host QOS metrics.

3. The non-transitory tangible computer readable storage medium of claim 1, wherein the composite recommendation function includes additional functions based on whether prefetch on a cache has been turned on, and CPU usage levels for storage system functions.

4. The non-transitory tangible computer readable storage medium of claim 3, wherein the storage system functions include data replication to other storage systems, scrubbers, and low priority tasks.

5. A method of adjusting host QOS metrics based on storage system performance, comprising the steps of:
   setting host QOS metrics by a host, the host QOS metrics specifying throughput, bandwidth, and response parameters to be achieved by a storage system in connection with servicing a workload from the host on the storage system, the storage system comprising a plurality of storage groups;
   receiving the workload by the storage system from the host, the workload being associated with the host QOS metrics;
   collecting storage system performance data for each storage group during a time window;
   comparing storage system performance data with the host QOS metrics for each storage group during the time window to determine if the storage system performance is compliant with the host QOS metrics;
   generating recommended host QOS metrics for each storage group based on the storage system performance data and the host QOS metrics during the time window;
   using the recommended host QOS metrics to automatically set the host QOS metrics during the next upcoming time window; and
   iterating, for each time window, the steps of:
      receiving the workload;
      collecting storage system performance data;
      comparing storage system performance data with the host QOS metrics;
      generating recommended host QOS metrics; and
      using the recommended host QOS metrics to automatically set the host QOS metrics during the next upcoming time window;
   wherein when the difference between storage system performance and host QOS metrics exceeds a threshold, the step of generating recommend host QOS metrics and using the recommended host QOS metrics to automatically set the host QOS metrics comprises reducing the host QOS metrics to throttle the workload from the host on the storage system;

wherein the step of generating recommended host QOS metrics is implemented, for each storage group, for each time window, using a composite recommendation function;

wherein the host QOS metrics comprise throughput, bandwidth, and response time requirements per storage group;

wherein the composite recommendation function has a first function that determines, for each storage group for each time window, a respective difference between the storage system throughput for that storage group and the host QOS metric for throughput for that storage group;

wherein the composite recommendation function has a second function that determines, for each storage group for each time window, a respective difference between the storage system bandwidth for that storage group and the host QOS metric for bandwidth for that storage group;

wherein the composite recommendation function has a third function that determines, for each storage group for each time window, a respective difference between the storage system response time for that storage group and the host QOS metric for response time for that storage group; and wherein the composite recommendation function separately weights each of the first, second, and third functions, to enable greater emphasis to be placed on one of the functions of the composite function when determining recommended host QOS metrics.

6. The method of claim 5, further comprising using the storage system performance data to learn historical storage system usage patterns, and using the historical storage system usage patterns in the step of generating recommended host QOS metrics.

7. A method of adjusting host QOS metrics based on storage system performance, comprising the steps of:

setting host QOS metrics by a host, the host QOS metrics specifying throughput, bandwidth, and response parameters to be achieved by a storage system in connection with servicing a workload from the host on the storage system, the storage system comprising a plurality of storage groups;

receiving the workload by the storage system from the host, the workload being associated with the host QOS metrics;

collecting storage system performance data for each storage group during a time window;

comparing storage system performance data with the host QOS metrics for each storage group during the time window to determine if the storage system performance is compliant with the host QOS metrics;

generating recommended host QOS metrics for each storage group based on the storage system performance data and the host QOS metrics during the time window;

using the recommended host QOS metrics to automatically set the host QOS metrics during the next upcoming time window; and iterating, for each time window, the steps of:
  receiving the workload;
  collecting storage system performance data;
  comparing storage system performance data with the host QOS metrics;
  generating recommended host QOS metrics; and
  using the recommended host QOS metrics to automatically set the host QOS metrics during the next upcoming time window;

wherein when the difference between storage system performance and host QOS metrics exceeds a threshold, the step of generating recommend host QOS metrics and using the recommended host QOS metrics to automatically set the host QOS metrics comprises reducing the host QOS metrics to throttle the workload from the host on the storage system;

wherein the step of generating recommended host QOS metrics is implemented, for each storage group, for each time window, using a composite recommendation function;

wherein the host QOS metrics comprise throughput, bandwidth, and response time requirements per storage group;

wherein the composite recommendation function has a first function that determines, for each storage group for each time window, a respective difference between the storage system throughput for that storage group and the host QOS metric for throughput for that storage group;

wherein the composite recommendation function has a second function that determines, for each storage group for each time window, a respective difference between the storage system bandwidth for that storage group and the host QOS metric for bandwidth for that storage group;

wherein the composite recommendation function has a third function that determines, for each storage group for each time window, a respective difference between the storage system response time for that storage group and the host QOS metric for response time for that storage group; and wherein the composite recommendation function includes additional functions based on whether prefetch on a cache has been turned on, and CPU usage levels for storage system functions.

8. The method of claim 7, wherein the storage system functions include data replication to other storage systems, scrubbers, and low priority tasks.

* * * * *